United States Patent [19]

Spenadel et al.

[11] Patent Number: 5,246,783

[45] Date of Patent: Sep. 21, 1993

[54] ELECTRICAL DEVICES COMPRISING POLYMERIC INSULATING OR SEMICONDUCTING MEMBERS

[75] Inventors: Lawrence Spenadel, League City; Monica L. Hendewerk, Houston; Aspy K. Mehta, Humble, all of Tex.

[73] Assignee: Exxon Chemical Patents Inc., Linden, N.J.

[21] Appl. No.: 745,479

[22] Filed: Aug. 15, 1991

[51] Int. Cl.$^5$ .............................................. B32B 15/04
[52] U.S. Cl. .................................. 428/461; 174/110 R; 427/58; 428/76; 428/930
[58] Field of Search ............... 524/114; 526/129, 119; 502/117; 428/461, 457, 76, 930; 427/58; 174/110 R

[56] References Cited

U.S. PATENT DOCUMENTS

| | | | |
|---|---|---|---|
| 4,144,202 | 3/1979 | Ashcaft et al. | 524/114 X |
| 4,808,561 | 2/1989 | Welborn, Jr. | 526/129 X |
| 4,871,705 | 10/1989 | Hoel | 502/117 |
| 4,937,299 | 6/1990 | Ewen et al. | 526/119 |

Primary Examiner—Thomas J. Herbert, Jr.
Attorney, Agent, or Firm—Myron B. Kurtzman; Jaimes Sher

[57] ABSTRACT

Disclosed are electrically conductive and semiconductive devices utilizing polymers having resistance to water treeing and good dielectric properties. The polymer comprises ethylene polymerized with at least one $C_3$ to $C_{20}$ alpha-olefin and optionally at least one $C_3$ to $C_{20}$ polyene. The polymer utilized has a density in the range of about 0.86 g/cm$^3$ to about 0.96 g/cm$^3$, a melt index in the range of about 0.2 dg/min to about 100 dg/min, a molecular weight distribution in the range of about 1.5 to about 30, and a composition distribution breadth index greater than about 45 percent. For the polymer utilized, the tree rating is generally less than about 40, the power factor is in the range of about 0.0002 to about 0.0005, and the dielectric constant is in the range of about 1.8 to about 2.4.

52 Claims, 3 Drawing Sheets

ANALYSIS OF TREE RETARDANCY TEST SAMPLES

ELECTRICAL DEVICES COMPRISING POLYMERIC INSULATING OR SEMICONDUCTING MEMBERS

BACKGROUND OF THE INVENTION

1. Field of the Invention

This invention relates to electrically conductive or semiconductive products. In another aspect, this invention relates to electrically conductive or semiconductive products comprising polyolefins. In yet another aspect, this invention relates to electrically conductive or semiconductive products comprising polyolefins having improved resistance to the phenomenon of water treeing.

2. Description of the Related Art

Typical power cables generally comprise one or more conductors in a core that is generally surrounded by several layers that include, a first polymeric semiconducting shield layer, a polymeric insulating layer, a second polymeric semiconducting shield layer, a metallic tape shield, and a polymeric jacket.

A wide variety of polymeric materials have been utilized as electrical insulating and semiconducting shield materials for power cables and in other numerous applications. In order to be utilized in services or products where long term performance is desired or required, such polymeric materials, in addition to having suitable dielectric properties, must also be enduring and must substantially retain their initial properties for effective and safe performance over many years of service. For example, polymeric insulations utilized in building wire, electrical motor or machinery power wires, or underground power transmitting cables, must be enduring not only for safety but also out of economic necessity and practicality. It is easy to see the danger of a non-enduring polymeric insulator on building electrical wire, or the impracticality of having to replace underground transmission cables frequently because of a non-enduring polymeric insulation.

One major type of failure that polymeric power cable insulation can undergo, is the phenomenon known as treeing. Treeing generally progresses through a dielectric section under electrical stress so that, if visible, its path looks something like a tree, hence the name "treeing." Treeing may occur and progress slowly by periodic partial discharge, it may occur slowly in the presence of moisture without any partial discharge, or it may occur rapidly as the result of an impulse voltage. Trees may form at the site of a high electrical stress such as contaminants or voids in the body of the insulation-semiconductive screen interface.

In solid organic dielectrics, treeing is the most likely mechanism of electrical failures which do not occur catastrophically, but rather appear to be the result of a more lengthy process. In the prior art, extending the service life of polymeric insulation has been achieved by modifying the polymeric materials so that either trees are initiated at higher voltages than usual or the growth rate of trees is reduced once initiated.

The phenomenon of treeing itself can be further characterized as two distinct phenomena known as electrical treeing and water treeing.

Electrical treeing results from internal electrical discharges which decompose the dielectric. Although high voltage impulses can produce electrical trees, and the presence of internal voids and contaminants is undesirable, the damage which results from application of moderate A/C voltages to electrode/insulation interfaces which contain imperfections is more commercially significant. In this case, very high, localized stress gradients can exist and with sufficient time lead to initiation and growth of trees which may be followed by breakdown. An example of this is a high voltage power cable or connector with a rough interface between the conductor or conductor shield and the primary insulator. The failure mechanism involves actual breakdown of the modular structure of the dielectric material perhaps by electron bombardment. Much of the prior art is concerned with the inhibition of electrical trees.

In contrast to electrical treeing which results from internal electrical discharges which decompose the dielectric, water treeing is the deterioration of a solid dielectric material which is simultaneously exposed to moisture and an electric field. It is a significant factor in determining the useful life of buried power cables. Water trees initiate from sites of high electrical stress such as rough interfaces, protruding conductive points, voids, or imbedded contaminants but at a lower field than that required for electrical trees. In contrast to electrical trees, water trees are characterized by: (a) the presence of water is essential for their growth; (b) no partial discharge is normally detected during their growth; (c) they can grow for years before reaching a size where they may contribute to a breakdown; (d) although slow growing they are initiated and grow in much lower electrical fields than those required for the development of electrical trees.

Electrical insulation applications are generally divided into low voltage insulation which are those less than 1K volts, medium voltage insulation which ranges from 1K volts to 35K volts, and high voltage insulation, which is for applications above 35K volts.

In low to medium voltage applications, electrical treeing is generally not a pervasive problem and is far less common than water treeing, which frequently is a problem.

For medium voltage applications, the most common polymeric insulators are made from either polyethylene homopolymers or ethylene-propylene elastomers, otherwise known as ethylene-propylene-rubber (EPR).

Polyethylene is generally used without a filler as an electrical insulation material. Polyethylene has very good dielectric properties, especially dielectric constant and power factor. The dielectric constant of polyethylene is in the range of about 2.2 to 2.3 which is an acceptable value. The power factor, which is a function of electrical energy dissipated and lost, and therefore should be as low as possible, is around 0.0002, which is not only acceptable, but a very desirable value. The mechanical properties of polyethylene are also very adequate for utilization as medium voltage insulation.

However, polyethylenes are very prone to water treeing especially toward the upper end of the medium voltage range.

There have been attempts in the prior art to make polyethylene based polymers that would have long term electrical stability. For example, when dicumyl peroxide is used as a crosslinking agent for polyethylene, the peroxide residue functions as a tree inhibitor for some time after curing. However, these residues are eventually lost at most temperatures of electrical power cable service. U.S. Pat. No. 4,144,202 issued Mar. 13, 1979 to Ashcraft et al. discloses the incorporation into polyethylenes of at least one epoxy containing organo silane as a treeing inhibitor. However, a need still exists for a polymeric insulator having improved treeing resistance over such silane containing polyethylenes.

Unlike polyethylene which can be utilized, the other common medium voltage insulator, EPR must be filled with a high level of filler in order to resist treeing. When utilized as a medium voltage insulator, EPR will generally contain about 20 to about 50 weight percent filler, most likely, calcined clay, and it is preferably crosslinked with peroxides. The presence of the filler gives EPR a high resistance against propagation of trees. EPR also has comparable mechanical properties to polyethylene.

While the fillers utilized in EPR may help prevent treeing, they unfortunately will generally have poor dielectric properties, i.e. poor dielectric constant and poor power factor. The dielectric constant of filled EPR is in the range of about 2.3 to about 2.8. The power factor of filled EPR is on the order of about 0.002 to about 0.005, which is about an order of magnitude worse than polyethylene.

Thus, while polyethylene has good electric properties, and good mechanical properties, it needs improvement in water tree resistance. While filled EPR has good treeing resistance, it needs improvement in dielectric properties.

Therefore, a need exists in the insulation art for a polymeric insulation having good mechanical properties, good dielectric properties and good water treeing resistance.

SUMMARY OF THE INVENTION

According to one embodiment of the present invention there is provided an electrically conductive device comprising: (a) an electrically conductive member comprising at least one electrically conductive substrate; and (b) at least one electrically insulating member in proximity to the electrically conductive member. In this embodiment the insulating member comprises a polymer selected from the group consisting of ethylene polymerized with at least one comonomer selected from the group consisting of $C_3$ to $C_{20}$ alpha-olefins and $C_3$ to $C_{20}$ polyenes, and wherein the polymer has a density in the range of about 0.86 g/cm$^3$ to about 0.96 g/cm$^3$, a melt index in the range of about 0.2 dg/min to about 100 dg/min, a molecular weight distribution in the range of about 1.5 to about 30, and a composition distribution breadth index greater that about 45 percent.

According to another embodiment of the present invention, there is provided an electrically conductive device comprising: (a) an electrically conductive member comprising at least one electrically conductive substrate; and (b) at least one semiconductive member in proximity to the electrically conductive member. In this embodiment, the semiconducting member comprises the above described polymer.

According to yet another embodiment of the present invention, there is provided a semiconductive device comprising: (a) a semiconductive member; and (b) an electrically insulating member in proximity to the semiconductive member. In this embodiment, the semiconductive member and/or the electrically insulating member comprise the above described polymer.

According to still yet another embodiment of the present invention there is provided an electrically conductive device comprising: (a) an electrically conductive core member comprising at least one electrically conductive substrate; and (b) at least one protective layer substantially surrounding and supported by the core member. In this embodiment, at least one of the protective layers comprises the above described polymer.

The polymer utilized in the jacketing, insulating or semiconducting member has a tree rating less than about 40, preferably less than about 25. and most preferably less than about 15, and even more preferably less than about 10. Other properties of the polymer utilized in the present invention include a dielectric constant in the range of about 1.8 to about 2.4, and a power factor in the range of about 0.0002 to about 0.0005.

There are a number of structural variables in polyolefins which effect the ultimate properties of the polymer. Two of the most important are composition distribution (CD) and molecular weight distribution. Composition distribution refers to the distribution of comonomer between copolymer molecules. This feature relates directly to polymer crystallizability, optical properties, toughness and many other important use characteristics. Molecular weight distribution plays a significant role in melt processability as well as the level and balance of physical properties achievable. Also important is the molecular weight (MW) of the polymer, which determines the level of melt viscosity and the ultimately desired physical properties of the polymer. The type and amount of comonomer also effects the physical properties and crystallizability of the copolymer.

The polymers utilized in the jacketing, insulating or semiconducting members of the inventive devices of the present invention may be made by any suitable process which allows for the proper control of the above mentioned structural features (MW, MWD, CD, comonomer type and amount) to yield the desired polymer with the desired electrical properties. One suitable method is through the use of a class of highly active olefin catalysts known as metallocenes.

Metallocenes are well known especially in the preparation of polyethylene and copolyethylene-alpha-olefins. These catalysts, particularly those based on group IV B transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$, of about 2), to broad (as in a polydispersity of about 8).

Exemplary of the development of these metallocene catalysts for the polymerization of ethylene is U.S. Pat. No. 4,937,299 to Ewen et al. hereby incorporated by reference. Among other things, this patent teaches that the metallocene catalyst system may include a cocatalyst such as alumoxane, formed when water reacts with trialkyl aluminum with the release of methane, which alumoxane complexes with the metallocene compound to form the catalyst. However other cocatalysts may be used with metallocenes, such as trialkylaluminum compounds; or ionizing ionic compounds such as, tri(nbutyl)ammoniumtetra(pentafluorophenyl) boron, which ionize the neutral metallocene compound, such ionizing compounds may contain an active proton, or some other cation such as carbonium, which ionizing the metallocene on contact, forming a metallocene cation associated with (but not coordinated or only loosely coordinated to) the remaining ion of the ionizing ionic compound. Such compounds are described in U.S. application Ser. Nos. 008,800, now abandoned, and 133,480 (published as E.P.-A-0277044 on Aug. 3, 1988), U S. application Ser. Nos. 011,471, now abandoned, and 133,052 (published as E.P.-A-0277003 on Aug. 3, 1988), all herein incorporated by reference.

Metallocene catalysts are particularly attractive in making tailored ultrauniform and super random specialty copolymer. For example, if a lower density copolymer is being made with a metallocene catalyst such as very low density polyethylene, (VLDPE), an ultrauniform and super random copolymerization will occur, as contrasted to the polymer produced by copolymerization using a conventional Ziegler catalyst.

In view of the ongoing need for polymeric electrical insulators and semiconductors having good mechanical properties, good dielectric properties and good water treeing resistance, it would be desirable to provide products utilizing the high quality characteristics of polyolefins prepared with metallocene catalysts.

Accordingly, the present invention particularly relates to polymeric products utilizing polyolefins, wherein the products have good mechanical properties, good dielectric properties and good water treeing resistance, and are useful as electrical insulators and semiconductors.

DETAILED DESCRIPTION OF THE INVENTION

Figure 1:
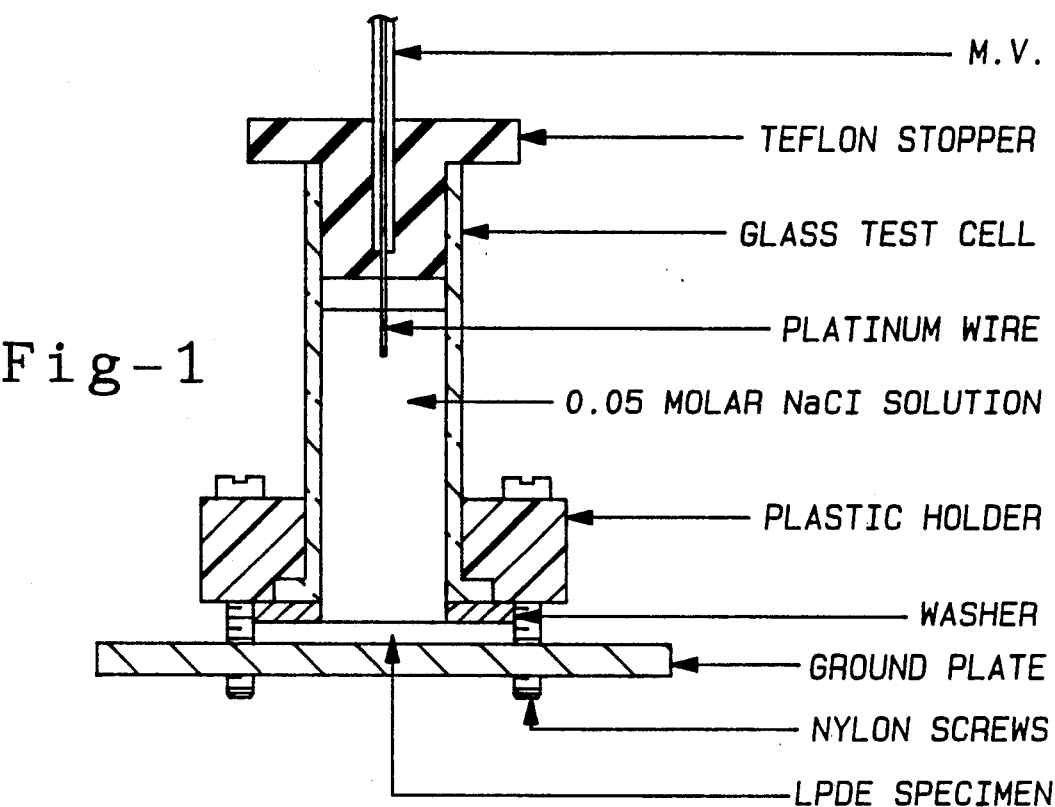
FIG. 1 is an illustration of the test apparatus utilized to determine the degree of treeing of the various samples that were tested.

The polymer utilized in the jacketing, insulating or semiconducting members of the devices of the present invention is selected from the group of polymers consisting of ethylene polymerized with at least one comonomer selected from the group consisting of $C_3$ to $C_{20}$ alpha-olefins and $C_3$ to $C_{20}$ polyenes. The types of monomers selected in the polymer utilized in the present invention will depend upon economics and the desired end use of the resultant device.

The polyene utilized in the present invention is generally has in the range of about 3 to about 20 carbon atoms. Preferably, the polyene has in the range of about 4 to about 20 carbon atoms, most preferably in the range of about 4 to about 15 carbon atoms. Preferably, the polyene is a diene, that generally has in the range of about 3 to about 20 carbon atoms. Preferably, the diene utilized in the present invention is a straight chain, branched chain or cyclic hydrocarbon diene preferably having from about 4 to about 20 carbon atoms, and most preferably from about 4 to about 15 carbon atoms, and still most preferably in the range of about 6 to about 15 carbon atoms. Most preferably, the diene is a nonconjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Of the dienes typically used to prepare EPR's, the particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

Generally, the alpha-olefins suitable for use in the present invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

Preferably, the polymers utilized in the devices of the present invention are either ethylene/alpha-olefin copolymers or ethylene/alpha-olefin/diene terpolymers. Illustrative non-limiting examples of suitable copoymers are those such as ethylene/butene-1, ethylene/hexene-1, ethylene/octene-1, and ethylene/propylene copolymers. Suitable examples of terpolymers include ethylene/propylene/1,4-hexadiene and ethylene/butene-1/1,4-hexadiene.

The polymers suitable in the present invention with desired monomer levels can be prepared by polymerization of the suitable monomers in the presence of supported or unsupported catalysts systems. Preferably the catalyst system utilized is a metallocene catalyst system.

The precise monomer content of the polymers utilized in the present invention will depend upon economics and the desired applications of the resultant device. Typically the polymers utilized in the present invention, will generally comprise in the range of about 68 mole percent to about 99 mole percent ethylene (based on the total moles of monomer). Preferably, the polymers have a minimum of 73 mole percent, most preferably, 75 mole percent ethylene. Preferably, the polymers have a maximun of 98, most preferably, 94 mole percent ethylene. Preferably, the polymers utilized in the jacketing, insulating or semiconducting members of the present invention, will generally comprise in the range of about 73 mole percent to about 98 mole percent ethylene, and most preferably in the range of about 75 mole percent to about 94 mole percent. The other monomers will comprise the balance of the polymer.

The polymers utilized in the polymeric members of the present invention have a density in the range of about 0.860 g/cm$^3$ to about 0.960 g/cm$^3$. Preferably, the polymers have a minimum density of about 0.865 g/cm$^3$, most preferably about 0.870 g/cm$^3$. Preferably, the polymers have a maximum density of about 0.93 g/cm$^3$, most preferably about 0.91 g/cm$^3$. Preferably the density is in the range of about 0.865 g/cm$^3$ to about 0.93 g/cm$^3$. Most preferably, the density is in the range of about 0.870 g/cm$^3$ to about 0.910 g/cm$^3$. Densities were measured using standard accepted procedures, except that they were additionally conditioned by holding them for 48 hours at ambient temperature (23° C.), prior to density measurement.

The melt index (MI) of the polymers utilized in the present invention is such that the polymer can be extruded in the desired end product. Generally the melt index is in the range of about 0.2 dg/min to about 100 dg/min. Preferably, the MI is at least about 1 dg/min, most preferably at least about 3 dg/min. Preferably, the maxium MI is about 50 dg/min, most preferably about 30 dg/min. Preferably the MI is in the range of about 1 dg/min to about 50 dg/min, and most preferably in the range of about 3 dg/min to about 30 dg/min. MI as measured herein was determined according to ASTM D-1238 (190/2.16). High load MI was determined according to ASTM D-1238 (190/21.6).

The polymers utilized in the electrically conductive or semiconductive devices of the present invention have a molecular weight distribution such that the polymer will have the desired electrical properties and still be processable into the desired end product. The ratio of $M_w/M_n$ is generally in the range of about 1.5 to about 30. The maxium ratio is preferably about 10 and most preferably about 3.5. The minimum ratio is about 1.5, most preferably about 1.8. Preferably the ratio is in the range of about 1.7 to about 10, and most preferably in the range of about 1.8 to about 3.5.

The composition distribution breadth index (CDBI) of the polymers utilized in the polymeric members of the present invention is generally in about 45 percent or higher. Preferably, the CDBI is about 50 percent or higher. Most preferably, the CDBI is about 60 percent or higher, and ever more preferably, about 70 percent or higher. As used herein, the CDBI is defined as the weight percent of the copolymer molecules having a comonomer content within 50 percent (i.e.±50%) of the median total molar comonomer content. The CDBI of linear polyethylene, which does not contain a comonomer, is defined to be 100%.

The Composition Distribution Breadth Index (CDBI) is determined via the technique of Temperature Rising Elution Fractionation (TREF). CDBI determination clearly distinguishes, for example, the plastomers utilized in this invention (narrow composition distribution as assessed by CDBI values of about 45% or higher) from those traditionally utilized in prior art insulation products (broad composition distribution as assessed by CDBI values generally less than 45%). The benefits to the discovery of the subject invention that accrue through the specific use of plastomers of narrow composition distribution are elucidated later in the examples. The CDBI of a copolymer is readily calculated from data obtained from techniques known in the art, such as, for example, temperature rising elution fractionation as described, for example, in U.S. application Ser. No. 151,350, filed Feb. 2, 1988, now U.S. Pat. No. 5,008,204, or in Wild et al., *J. Poly. Sci. Poly. Phys. Ed.*, vol. 20, p. 441 (1982). Unless otherwise indicated, terms such as "comonomer content", "average comonomer content" and the like refer to the bulk comonomer content of the indicated interpolymer blend, blend component or fraction on a molar basis.

By the use of a polymer as described above, a jacket, insulating or semiconducting member can be made that will have a resistance to treeing and good electrical properties, that is, good dielectric constant and power factor.

Figure 2:
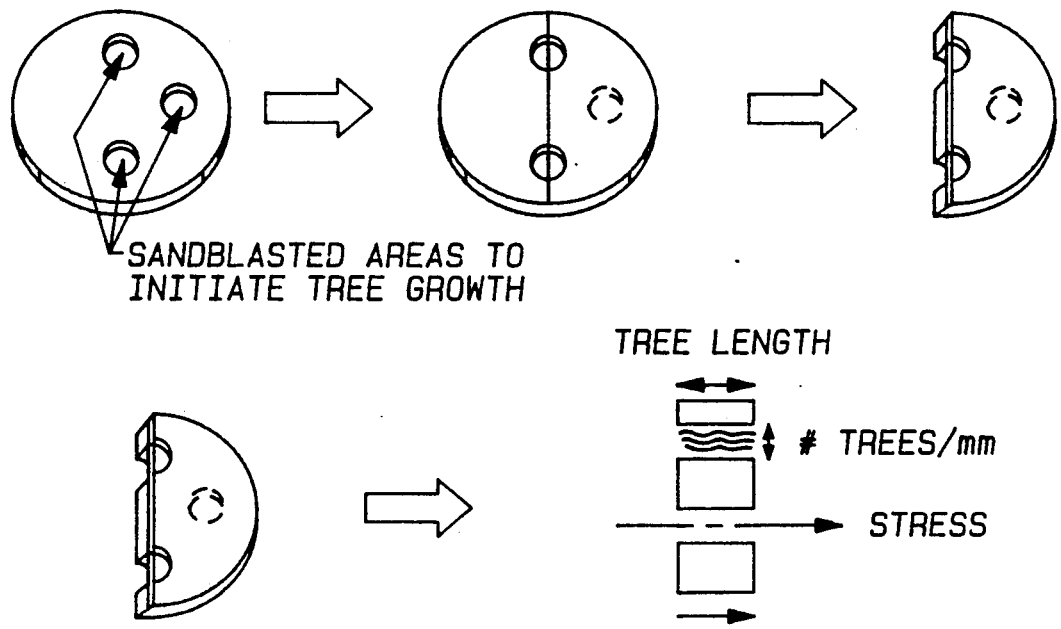
FIG. 2 is a representation of the method for analyzing the test samples once they have been aged in the test apparatus of FIG. 1.

The tree rating as described in the present invention is determined according to the method of Bulinski et al., "Water Treeing in a Heavily Oxidized Cross-linked Polyethylene Insulation", Sixth International Symposium On High Voltage Engineering, New Orleans (Aug. 28-Sep. 1, 1989), herein incorporated by reference. The general method is as follows. A 75 mil plaque of the material to be tested is pressed at 175° C. and then cut into 1 inch diameter circles. Three small areas are sandblasted onto the surface of the circles to accelerate tree initiation. The samples were stressed for 3,500 hours at 6 kV, 1000 HZ at 75° C., in contact with 0.05 M CuSO$_4$ solution, using an apparatus as shown in FIG. 1. The degree of treeing was determined by slicing the sample vertically through two of the sandblasted areas and then measuring the length of the trees relative to the thickness of the sample (stress is proportional to the thickness). FIG. 2 is a representation of the method for analyzing the tree retardancy test samples.

The polymer utilized in the jacketing, insulating or semiconducting member has a good tree rating superior to that of neat polyethylenes, and that compares well to filled EPR's. The tree rating is generally less than about 40, preferably less than about 25, and most preferably less than about 15, and still even more preferably less than about 10.

Not only do the polymers utilized in the present invention have good resistance to treeing that compares favorably to filled EPR's, they also posses good dielectric properties that compare favorably to neat polyethylenes. Generally the dielectric constant of the polymers utilized in the present invention is in the range of about 1.8 to about 2.4.

Another good dielectric property possessed by the polymers utilized in the present invention is a good power factor. The power factor of the polymer is generally in the range of about 0.0002 to about 0.0005.

The polymers useful in fabricating the jacket, insulating or semiconducting members of the present invention may be produced by any suitable method that will yield a polymer having the required properties, that when fabricated into the jacket, insulating or semiconducting members of the present invention will have suitable resistance to treeing and good electrical properties. An illustrative nonlimiting example of a particularly suitable method of making the polymer useful in the present invention utilizes a class of highly active olefin catalysts known as metallocenes, which are well known especially in the preparation of polyethylene and copolyethylene-alpha-olefins. These catalysts, particularly those based on group IV B transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$ of about 2), to broad (as in a polydispersity of about 8).

Exemplary of the development of these metallocene catalysts for the polymerization of ethylene are U.S. Pat. No. 4,937,299 to Ewen et al., U.S. Pat. No. 4,808,561 to Welborn, and U.S. Pat. No. 4,814,310 to Chang, all hereby incorporated by reference. Among other things, Ewen et al. teaches that the structure of the metallocene catalyst includes an alumoxane, formed when water reacts with trialkyl aluminum with the release of methane, which alumoxane complexes with the metallocene compound to form the catalyst. Welborn teaches a method of polymerization of ethylene with alpha-olefins and/or diolefins. Chang teaches a method of making a metallocene alumoxane catalyst system utilizing the absorbed water in a silica gel catalyst support.

Specific methods for making ethylene/alpha-olefin copolymers, and ethylene/alpha-olefin/diene terpolymers are taught in U.S. Pat. No. 4,871,705 to Hoel, and in U.S. application Ser. No. 207,672, filed Jun. 16, 1988 by Floyd et al, now abandoned, (published a E.P.-A-0347129 on Dec. 20, 1989), respectively, both hereby incorporated by reference.

Utilizing a metallocene catalyst, the polymers useful in the present invention can be produced in accordance with any suitable polymerization process, including a slurry polymerization, gas phase polymerization, and high pressure polymerization process.

A slurry polymerization process generally uses super-atmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

Preferably, the polymer utilized in the insulating or semiconducting components of the present invention is formed by gas-phase polymerization. A gas-phase process utilizes super-atmospheric pressure and temperatures in the range of about 50°–120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50° C.–120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The polymers of the present invention may also be produced in accordance with a high pressure process by polymerizing ethylene in combination with the other desired monomers in the presence of the metallocene alumoxane catalyst system. It is important in the high pressure process, that the polymerization temperature be above about 120° C. but below the decomposition temperature of said product and that the polymerization pressure be above about 500 bar ($kg/cm^2$). In those situations wherein the molecular weight of the polymer product that would be produced at a given set of operating conditions is higher than desired, any of the techniques known in the art for control of molecular weight, such as the use of hydrogen or reactor temperature, may be used to make the polymer useful in the devices of the present invention.

The polymers utilized in the present may be cross-linked chemically or with radiation. A suitable cross-linking agent is dicumyl peroxide.

The insulating member of the device of the present invention may comprise a "neat" polymer, or it may optionally be filled. An illustrative example of a suitable filler is Kaolin clay. The semiconducting member of the present invention must be filled with a conducting filler to render the member semiconducting. The most common filler for semiconducting applications is carbon black, which will generally comprise 30 to 40 weight percent of the filled semiconducting member.

If filled, the products of the present invention should not be filled past that level that would cause undue degradation of the electrical and/or mechanical properties of the polymer. Generally, for that reason, the filled member should comprise no more than about 50 weight percent filler, based on the total weight of the filled member, and preferably no more than about 35 weight percent filler.

Other additives commonly employed in polyolefin compositions such as, for example, cross-linking agents, antioxidants, processing aids, pigments, dyes, colorants, metal deactivators, oil extenders, stabilizers, and lubricants may be utilized in the present invention.

Figure 3:
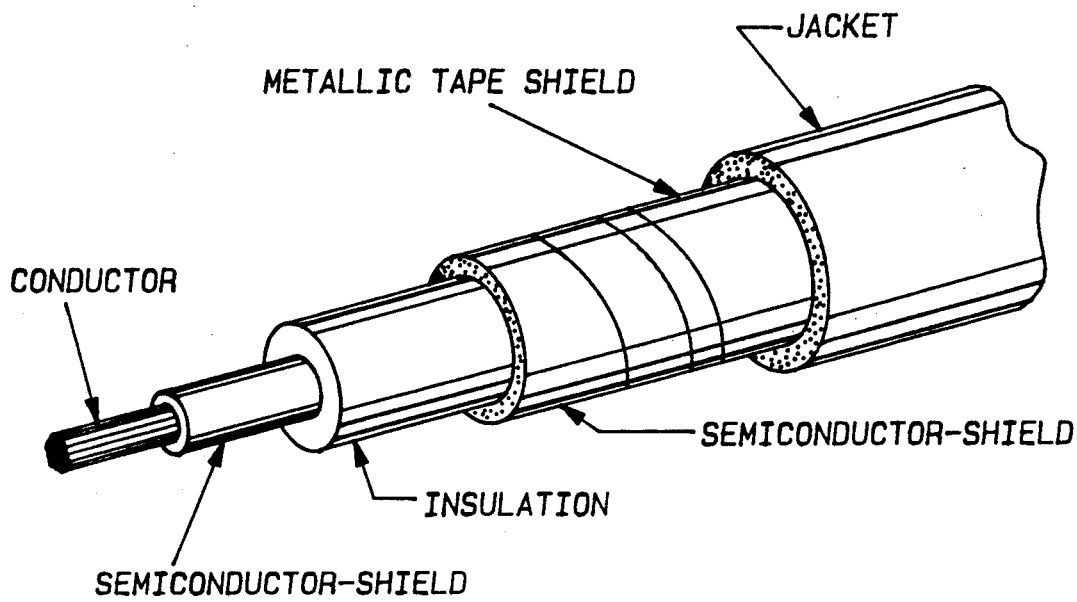
FIG. 3 is an illustration of a typical power cable, and shows a multiplicity of conducting substrates comprising the conductive core that is substantially surrounded by several protective layers that are either jacket, insulator or semiconductive shields layers.
Figure 4:
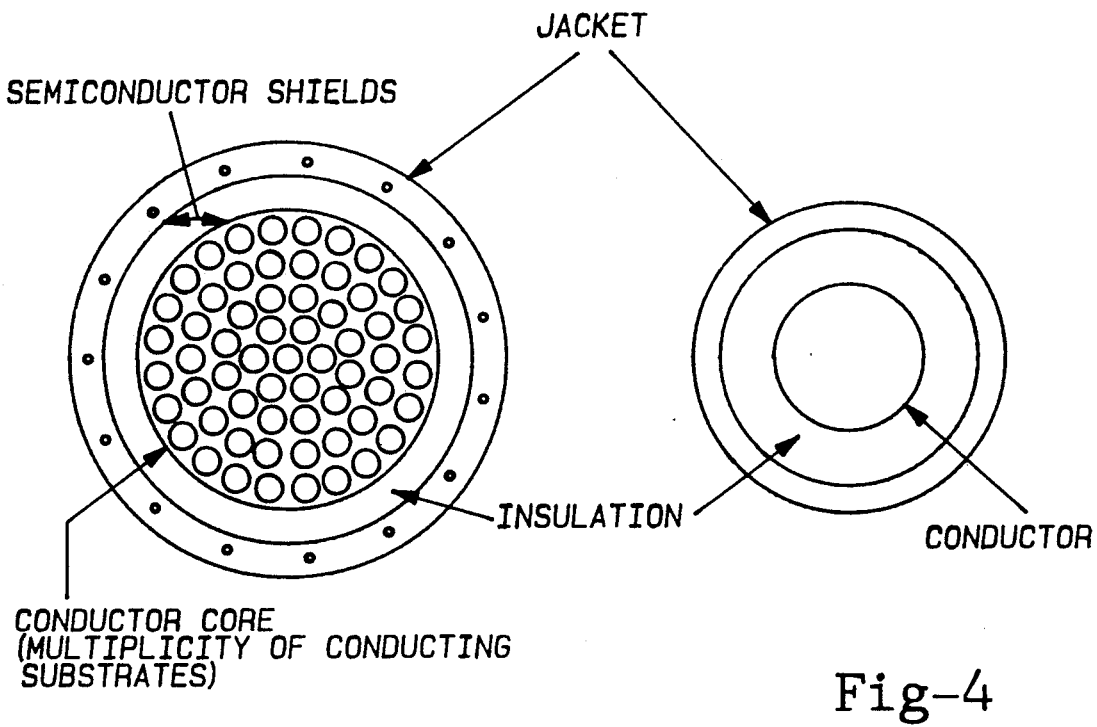
FIG. 4(a) and FIG. 4(b) are cross-sectional views of typical medium voltage and low voltage power lines respectively.

The device of the present invention may take on any form that is suitable for the use to which it will serve. The components of the devices of the present invention, i.e. The insulating, semiconducting, and conducting members, can be arranged relative to each other in a wide variety of ways, depending upon the desired use of the device. Generally, the insulating member must be arranged so that it will function as an insulator of the conducting or semiconducting member. For example, the various components may be: affixed together, in proxity to each other, in contact with each other, adjacent to each other, or one may substantially surround another. Generally in the power cable field, the device will comprise a conducting core of one or more electrically conducting substrates that is substantially surrounded by one or more layers of insulators and/or semiconductor shields. FIG. 3 is an illustration of a typical power cable, which shows a multiplicity of conducting substrates comprising the conductive core that is substantially surrounded by several protective layers that are either jackets, insulators or semiconductive shields. FIG. 4(a) is a cross-sectional view of a typical medium voltage power cable, showing a conductor core comprising a multiplicity of conducting substrates, a first semiconducting shield layer, an insulation layer, a second semiconducting shield layer, and a jacket. FIG. 4(b) is a cross-sectional view of a typical low voltage power cable showing a conductor substantially surrounded by insulation and jacket layers. While the present invention is of greatest advantage in low and medium voltage applications where water treeing is most common, it is also useful in high voltage applications.

Traditionally, the jacketing materials normally employed in power cables comprise neoprene over EPR insulated cables, and polyvinyl chloride (PVC) over polyethylene insulated cables. According to this invention, not only is the polymer of the present invention suitable for the insulating and shielding layers, it may also be utilized in the jacket layer.

All of the components of the compositions utilized in the present invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition to be utilized are uniformly admixed and blended together, they are further processed to fabricate the devices of the present invention. Prior art methods for fabricating polymer insulated cable and wire are well known, and fabrication of the device of the present invention may generally be accomplished any of the various extrusion methods.

In a typical extrusion method, an optionally heated conducting core to be coated is pulled through a heated extrusion die, generally a cross-head die, in which a layer of melted polymer is applied to the conducting core. Upon exiting the die, the conducting core with the applied polymer layer is passed through a cooling section, generally an elongated cooling bath, to harden. Multiple polymer layers may be applied by consecutive extrusion steps in which an additional layer is added in each step, or with the proper type of die, multiple polymer layers may be applied simultaneously.

The conductor of the present invention may generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

EXAMPLES

The ethylene/α-olefin copolymers suitable for use in the present invention may be prepared as shown in Example I. The diolefin containing terpolymer utilized in the present invention may be prepared as shown in Examples II and III.

EXAMPLE I

Preparation of ethylene/α-olefin copolymers

A catalyst is prepared by adding 5.1 liters of a 10% solution of trimethylaluminum in heptane into a dry and oxygen-free two-gallon reactor equipped with a mechanical stirrer. 800 g of undehydrated silica gel, containing 12.3% water, is then added into the reactor. After the addition is complete, the mixture is stirred at ambient temperature for one hour. 20 g of di-(n-butylcyclopentadienyl) zirconium dichloride slurried in 30 l of heptane is then added into the reactor and the mixture is allowed to react at ambient temperature for 30 minutes. The reactor is then heated to 65° C., while a nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, butene-1 and nitrogen were fed continuously into the reactor to maintain a constant production rate. Product was periodically removed from the reactor to maintain the desired bed weight. The polymerization conditions are shown in Table I below.

TABLE I

| Gas Phase Polymerization | | | |
|---|---|---|---|
| | A | B | C |
| Temperature (°F.) | 121 | 110 | 145 |
| Total Pressure (psia) | 300 | 300 | 300 |
| Gas Velocity (ft/sec) | 1.55 | 1.85 | 1.70 |
| Catalyst Feed Rate (g/hr) | 3.0 | 3.5 | 8.9 |
| Butene-1 Feed Rate (lb/hr) | 5.8 | 6.0 | 5.8 |
| Production Rate (lb/hr) | 33 | 33 | 28 |

The polymerized products "A", "B" and "C" are useful for use in the present invention and had characterizing properties as shown in Table II below:

TABLE II

| Characterization Data | | | |
|---|---|---|---|
| | A | B | C |
| Melt Index (dg/min) | 3.3 | 9.5 | 9.0 |
| Density (g/cm$^3$) | 0.882 | 0.88 | 0.895 |
| $M_n$ | 41380 | 27910 | 31450 |
| $M_w$ | 78030 | 58590 | 62670 |
| $M_w/M_n$ | 1.89 | 2.10 | 1.99 |

Note:
$M_n$ is number average molecular weight.
$M_w$ is weight average molecular weight.
Both determined via the technique of Gel Permeation Chromatography, a, well accepted procedure.

It will be recognized by persons skilled in the art, that products with different Melt Indices and Densities to A, B, and C above can be obtained by changing the process conditions. Additionally, the composition of the products can be altered, depending on the choice of alpha-olefin comonomer used.

EXAMPLE II

Preparation of diolefin-containing copolymers

A catalyst is prepared by adding 2.7 liters of a 10% solution of methylalumoxane (MAO) in toluene into a dry and oxygen-free two-gallon reactor equipped with a mechanical stirrer. 800 g of silica gel, dried at 800° C. is slowly added into the reactor. After the addition is complete, the mixture is stirred at 65° C. for one hour. 20 g of bis-indenyl zirconium dichloride dissolved in 30 l of toluene is then added into the reactor and the mixture is allowed to react at 65° C. for 30 minutes. Nitrogen gas is then purged through the reactor to remove the solvent. The nitrogen purging is stopped when the mixture in the reactor turns into a free-flowing powder.

The polymerization was conducted in a 16-inch diameter fluidized gas phase reactor. Ethylene, 1-4 hexadiene, butene-1 and nitrogen were fed continuously into the reactor to maintain a constant production rate. Product was periodically removed from the reactor to maintain the desired bed weight. The polymerization conditions are shown in Table III below.

TABLE III

| Gas Phase Polymerization | | |
|---|---|---|
| | D | E |
| Temperature (°F.) | 136 | 136 |
| Total Pressure (psia) | 300 | 300 |
| Gas Velocity (ft/sec) | 1.86 | 1.85 |
| Catalyst Feed Rate (g/hr) | 15 | 15 |
| Butene-1 Feed Rate (lb/hr) | 5.5 | 4.8 |
| 1-4 Hexadiene Feed Rate (lb/hr) | 0.7 | 0.5 |
| Production Rate (lb/hr) | 19 | 15 |

Polymerized product D had a Melt Index of 6, a density of 0.893 g/cm$^3$ and a 2.1 mole % level of incorporated 1-4 hexadiene. Polymerized product E had a Melt Index of 5.5, a density of 0.897 g/cm$^3$ and a 1.3 mole % level of incorporated 1,4 hexadiene.

It will be recognized by persons skilled in the art that products with different Melt Indices, Densities and levels of incorporated 1,4 hexadiene to D and E above, can be obtained by changing the process conditions. Additionally, the composition of the products can be altered, depending on the choice of alpha olefin comonomer used.

EXAMPLE III

Preparation of diolefin-containing copolymer

A catalyst is prepared by adding 5.1 liters of a 10% solution of trimethylaluminum in heptane into a dry and oxygen-free two-gallon reactor equipped with a mechanical stirrer. 800 g of undehydrated silica gel, containing 12.3% water, is slowly added into the reactor. After the addition is complete, the mixture is stirred at ambient temperature for one hour. 20 g os bis-indenyl zirconium dichloride slurried in 30 l of heptane is then added into the reactor and the mixture is allowed to react at ambient temperature for 30 minutes. The reactor is then heated to 65° C., while the nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, 1-4 hexadiene, butene-1 and nitrogen were fed continuously into the reactor to maintain a constant production rate. Product was periodically removed fron the reactor to maintain the desired bed weight. The polymerization conditions are shown in Table IV below.

TABLE IV

| Gas Phase Polymerization | |
|---|---|
| | F |
| Temperature (°F.) | 117 |
| Total Pressure (psia) | 300 |
| Gas Velocity (ft/sec) | 1.81 |
| Catalyst Feed Rate (g/hr) | 14.5 |
| Butene-1 Feed Rate (lb/hr) | 3.4 |
| 104 Hexadiene Feed Rate (lb/hr) | 0.65 |
| Production Rage (lb/hr) | 11 |

Polymerized product F had a Melt Index of 2.5 and a density of 0.887 g/cm$^3$ and a 2.0 mole % level of incorporated 1-4 hexadiene. As mentioned previously, products with different melt indices, densities and levels of 1-4 hexadiene can be obtained by changing the process conditions. Additionally, the composition of the products can be altered depending on the choice of alpha olefin comonomers used.

EXAMPLE IV

In this Example, Polymer C, a polymer described as being useful in the present invention is compared against 2 commercial LDPE homopolymers [EXXON's LD-400 and LD-411] that are representative of the polyethylene used to make XLPE power cable insulation. All polymers were tested unfilled and cross-linked (via dicumyl peroxide).

It is well known to those of skill in the art that unfilled LDPE has outstanding dielectric properties, superior to those of EP elastomers (i.e. EPR or EPDM) whether neat or filled. The data in TABLE V shows that POLYMER C has comparable dielectric performance to that displayed by LDPE.

TABLE V

| Dielectric Properties (Unfilled Polymers) | | | |
|---|---|---|---|
| Polymer C | 100 | | |
| LDPE Homopolymer (2.8 MI, 0.9175D) | | 100 | |
| LDPE Homopolymer (2.3 MI, 0.921D) | | | 100 |
| DICUP R | 2.6 | 2.6 | 2.6 |
| ELECTRICAL PROPERTIES DIELECTRIC CONSTANT | | | |
| + ORIGINAL | 2.30 | 2.37 | 2.37 |
| + 1 DAY/90C WATER | 2.00 | 2.16 | 2.16 |
| + 7 DAYS/90C WATER | 1.92 | 2.15 | 2.14 |
| + 14 DAYS/90C WATER | 1.92 | 2.14 | 2.12 |
| + ORIGINAL POWER FACTOR | 0.00053 | 0.00057 | 0.00056 |
| + 1 DAY/90C WATER | 0.00060 | 0.00054 | 0.00055 |
| + 7 DAYS/90C WATER | 0.00063 | 0.00056 | 0.00062 |
| + 14 DAYS/90C WATER | 0.00069 | 9.00056 | 0.00064 |

EXAMPLE V

In this Example, dielectric properties were remeasured for four Superohm 3728 type formulations (at 0, 30, 60 and 100 parts filler as shown in TABLE VI). The data in TABLE VII shows the gradual deterioration in the dielectric performance with increasing filler loading. Commercially available filled compounds based on EP elastomers vary in filler loading from about 30 parts (20 wt %) to about 110 parts (47 wt %), depending on requirements for product extrudeability, dielectric performance, tree retardance performance, physical properties, as well as other requirements. The polymers utilized in this invention that display inherently good tree retardance allow compound formulation with less filler, thereby allowing a more favorable balance of dielectric, tree retardant and physical properties to be achieved.

TABLE VI

| Filled Insulation Formulations | |
|---|---|
| POLYMER: | Ethylene/Butene-1 Copolymer 2.0 Melt Index 0.8971 G/CM$^3$ Density Similar to Polymer C, but lower Melt Index |
| FORMULATIONS: | SUPEROHM 3728 Type Formulation, But at 0, 30, 60 and 100 Parts Filler (TRANSLINK - 37, i.e. calcined clay) per 100 parts of Polymer |
| NOTE: | SUPEROHM 3728 is a well regarded filled EP-based electrical insulation compound TRANSLINK-37 is a calcined clay and is a widely used filler used in filled electrical insulation compounds |

TABLE VII

Dielectric Properties of Filled Insulation Formulations

|  | (0 Parts Filler) | (30 Parts Filler) | (60 Parts Filler) | (100 Parts Filler) |
|---|---|---|---|---|
| ORIGINAL | | | | |
| Dielectric Constant | 2.281 | 2.488 | 2.631 | 2.836 |
| Power Factor | 0.00130 | 0.00245 | 0.00300 | 0.00399 |
| Vol. Resist ($10^{15}$ OHM-CM) | 38 | 4.9 | 4.7 | 3.0 |
| AGED 24H WATER 90 C | | | | |
| Dielectric Constant | 2.225 | 2.436 | 2.543 | 2.776 |
| Power Factor | 0.00170 | 0.00221 | 0.00262 | 0.00323 |
| Vol. Rest. ($10^{15}$ OHM-CM) | 13 | 3.2 | 7.5 | 1.8 |

EXAMPLE VI

In this Example, polymers useful as insulating and semiconducting materials, are compared against commercially available polymers.

The data show polymers of this invention provide a favorable balance of dielectric properties, tree rating, and physical properties vis-a-vis, unfilled crosslinked polyethylene and filled EPR.

75° C., in contact with 0.05 M $CuSO_4$ solution, using an apparatus as shown in FIG. 1. The degree of treeing was determined by slicing the sample vertically through two of the sandblasted areas and then measuring the length of the trees relative to the thickness of the sample (stress is proportional to the thickness). FIG. 2 is a representation of the method for analyzing the tree retardancy test samples. Tree rating data is presented in TABLE IX below.

In TABLE IX, the polymers suitable to be utilized in this invention are referred to by the tradename EXACT, or by the polymer designation from Examples 1–3. The commercially available EXACT polymers are referred by product number. Those EXACT polymers not having a product number, are pilot plant samples.

TABLE IX

NRC TREE RETARDANCY DATA (Sorted by Length/Thickness ($\times$ 100))

| Sample* | | L/T($\times$ 100) |
|---|---|---|
| 32 | LPDE (50)/Semicrystalline EP(50)/Translink 37(25) | 0 |
| 21 | Commercial Filled MV Insulation Compound | 0 |
| 22 | Commercial Filled MV Insulation | 6 |

TABLE VIII

Evaluation of Insulation Formulations

|  | 1 Unfilled Crosslinked LDPE | 2* Filled Crosslinked EP I | 3** Filled Crosslinked EP II | 4* Filled Crosslinked Polymer A | 5 Unfilled Crosslinked Polymer F | 6* Filled Crosslinked Polymer D |
|---|---|---|---|---|---|---|
| DIELECTRIC PROPERTIES | | | | | | |
| Dielectric Strength (V/MIL) | 775 | 750 | 725 | 700 | 775 | 720 |
| Dielectric Constant | | | | | | |
| Original | 2.37 | 2.76 | 2.85 | 2.71 | 2.32 | 2.70 |
| Aged 24 Hr/90#C Water | 1.16 | 2.51 | 2.7 | 2.44 | 2.05 | 2.50 |
| Power Factor | | | | | | |
| Original | 0.00030 | 0.0021 | 0.004 | 0.0024 | 0.00026 | .0025 |
| Aged 24 Hr/90#C Water | .00034 | 0.0064 | 0.008 | 0.0063 | 0.00026 | .0065 |
| TREEING PERFORMANCE | | | | | | |
| Tree Retardance Rating (100 $\times$ L/T) | 68 | 1–5 | 15–20 | 15–35 | 5–10 | 5–10 |
| PHYSICAL PROPERTIES | | | | | | |
| Tensile Strength (PSI) | | | | | | |
| Original | 2300 | 1710 | 1300 | 2555 | 2475 | 2700 |
| Aged 7 days (°C.) | 136 | 150 | 150 | 150 | 150 | 150 |
| % Retained on Aging | 95 | 100 | 100 | 100 | 98 | 98 |
| Elongation (%) | | | | | | |
| Original | 525 | 320 | 300 | 405 | 540 | 370 |
| Aged 7 days (°C.) | 136 | 150 | 150 | 150 | 150 | 150 |
| % Retained on Aging | 95 | 94 | 90 | 92 | 98 | 90 |

*Typical Superohm type formulation.
**Alternative commercial EP formulation with a minimal stabilization package.

EXAMPLE VII

In this Example, polymers suitable for use in the present invention are compared against various commercially available polymers for tree retardancy. As was explained above in the Detailed Description, the tree rating as utilized in the present invention is determined according to the method of Bulinski et al., "Water Treeing in a Heavily Oxidized Cross-linked Polyethylene Insulation", Sixth International Symposium On High Voltage Engineering, New Orleans (Aug. 28–Sep. 1, 1989). The general method is as follows. A 75 mil plaque of the material to be tested is pressed at 175° C. and then cut into 1 inch diameter circles. Three small areas are sandblasted onto the surface of the circles to accelerate tree initiation. The samples were stressed for 3,500 hours at 6 kV, 1000 HZ at

| | Compound | |
|---|---|---|
| 14 | Amorphous PE | 7 |
| 17 | POLYMER F | 8 |
| 33 | LDPE (50)/Semicrystalline EP (50)/Translink 37(50) | 9 |
| 10 | Commercial XLPE | 9 |
| 15 | Commercial P(100)/Translink 37(30) | 11 |
| 9 | POLYMER C | 16 |
| 4 | MDV 87-31 (in commercial MV EP insulation formulation) | 16 |
| 19 | Commercial XLPE | 16 |
| 16 | Amorphous PE (100)/Translink 37(60) | 16 |
| 5 | Semi-crystalline EP copolymer/Flexon/Translink 37(101) | 16 |
| 31 | LD180 50/Semicrystalline EP(50) | 19 |
| 1 | EMS 4003 (SLP $\rho$ = 0.895, MI = 9, $C_2$ = /C4 =) | 20 |
| 11 | Commercial LLDPE | 20 |
| 6 | Commercial tree retardant XLPE | 22 |
| 13 | Amorphous PE | 25 |

TABLE IX-continued

NRC TREE RETARDANCY DATA
(Sorted by Length/Thickness (× 100))

| Sample* | | L/T(× 100) |
|---|---|---|
| 12 | EXACT ($\rho$ = 0.939, MI = 7, $C_2 = /C_4 =$) | 33 |
| 7 | POLYMER C | 33 |
| 8 | POLYMER A | 36 |
| 23 | EXACT ($\rho$ = 0.884, MI = 1.7, $C_2 = /C_3 =$) | 39 |
| 3 | Commercial LDPE | 46 |
| 30 | LDPE (60)/Semicrystalline EP (40) | 46 |
| 25 | EXACT ($\rho$ = 0.885, MI = 4, $C_2 = /C_6 =$) | 58 |
| 18 | Commercial XLPE | 68 |
| 27 | LDPE (90)/Semicrystalline EP(10) | 69 |
| 28 | LD180 80/Semicrystalline EP(20) | 70 |
| 24 | EXP314 ($\rho$ = 0.886, MI = 5, $C_2 = /C_4 =$) | 70 |
| 2 | POLYMER C | 70 |
| 26 | Commercial LDPE | 98 |
| 29 | LDPE (70)/Semicrystalline EP(30) | 98 |

*All samples were crosslinked with Dicup R and contain a minimal stabilization package.

EXAMPLE VIII

In this Example, the crosslinkability of the polymers utilized in the present invention are compared to commercially available polymers. The polymers were crosslinked with both dicumyl peroxide and with radiation.

Figure 5:
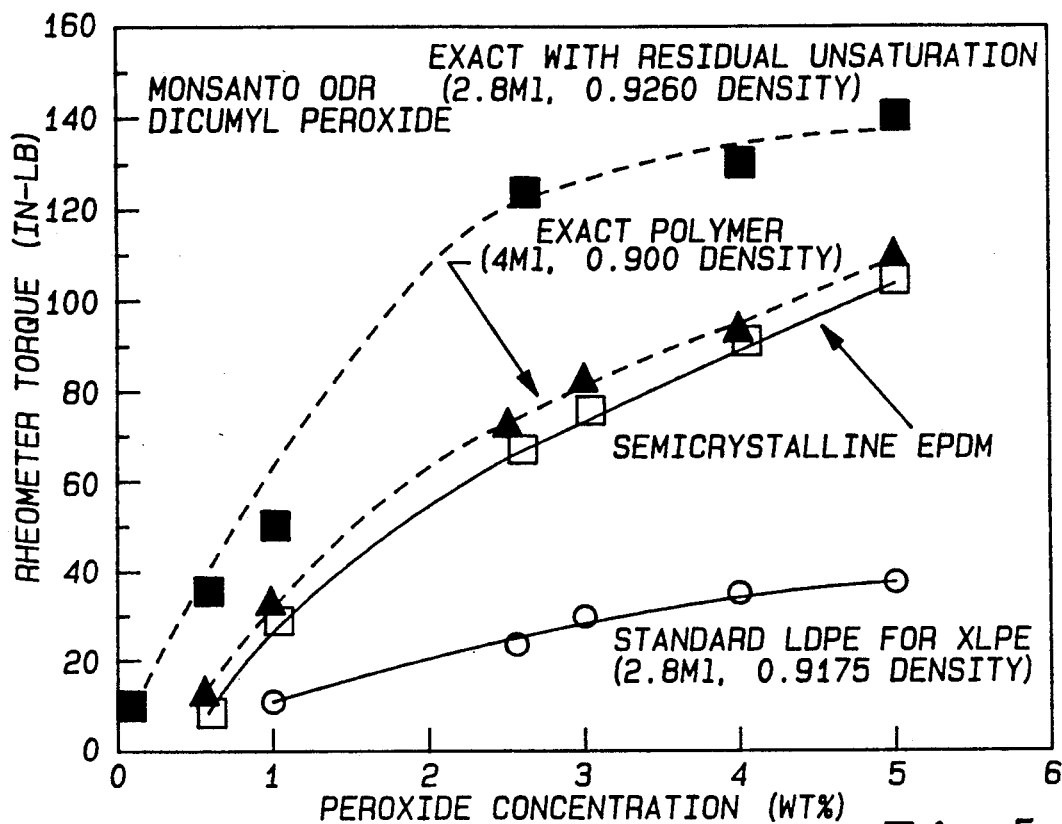
FIG. 5 is a graph of the peroxide response for various polymers.

The peroxide response of the polymers of the present invention (including diolefin-containing polymers which provide residual olefinic unsaturation) compared to semicrystalline EPDM and a standard LDPE are shown in FIG. 5. In this FIG. the polymers useful in this invention are designated by the tradename "EXACT". This figure shows that in an environment of equivalent peroxide levels, the polymers utilized in the present invention will have a greater response, as evidenced by greater torque values.

Figure 6:
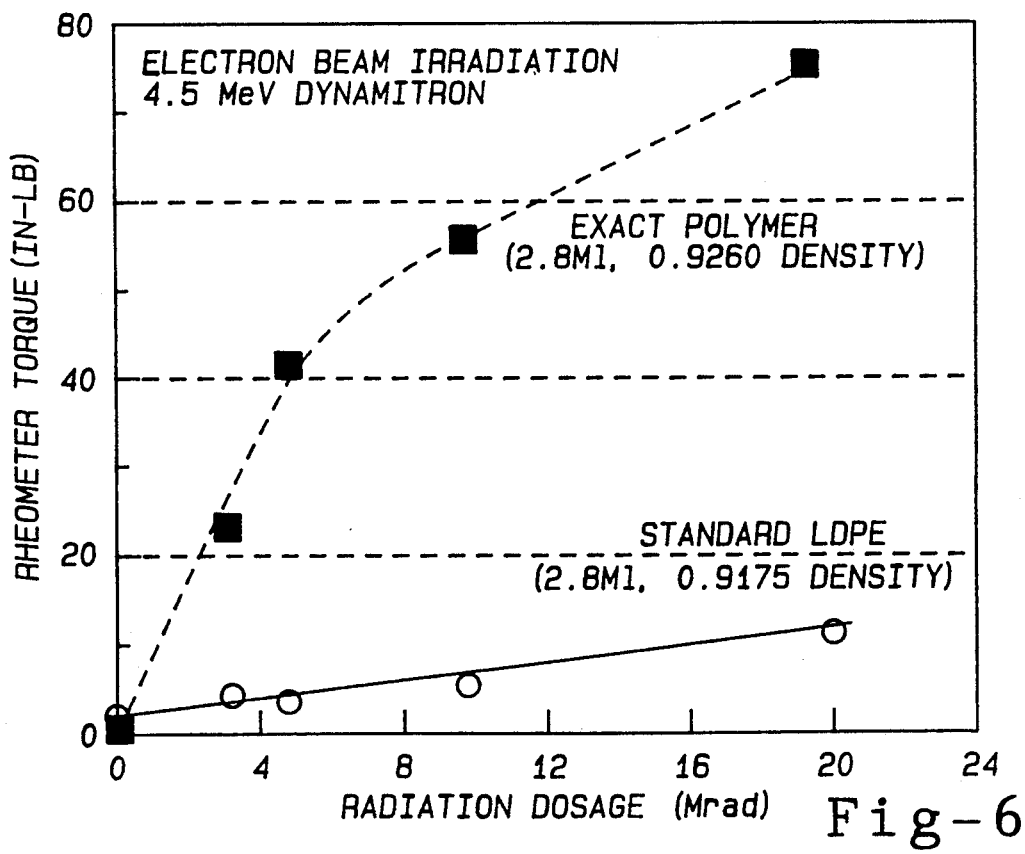
FIG. 6 is a graph of the radiation response for various polymers.

The radiation response of the polymers of the present invention compared to LDPE is shown in FIG. 6. In FIG. 6, the polymer useful in the present invention is designated by the tradename "EXACT". As can be seen in FIG. 6, the polymers utilized in the present invention show a greater response to radiation relative to LDPE as measured by levels of torque.

We claim:

1. An electrically conductive device having reduced treeing without the need of a treeing inhibitor, said device comprising:
   (a) an electrically conductive member comprising at least one electrically conductive substrate; and
   (b) at least one electrically insulating member substantially surrounding the electrically conductive member, wherein the insulating member comprises a polymer selected from the group consisting of ethylene polymerized with at least one comonomer selected from the group consisting of $C_3$ to $C_{20}$ alpha-olefins and $C_3$ to $C_{20}$ polyenes, and wherein the polymer has a density in the range of about 0.86 g/cm³ to about 0.96 g/cm³, a melt index in the range of about 0.2 dg/min to about 100 dg/min, a molecular weight distribution in the range of about 1.5 to about 30, and a composition distribution breadth index greater than about 45 percent.

2. The device of claim 1 wherein the polymer has at least one of the following properties selected from the group consisting of a density in the range of about 0.865 g/cm³ to about 0.93 g/cm³, a melt index in the range of about 1 dg/min to about 50 dg/min, a molecular weight distribution in the range of about 1.7 to about 10, and a composition distribution breadth index greater than about 50 percent.

3. The device of claim 1 wherein the polymer is polymerized utilizing a metallocene catalyst system.

4. The device of claim 1 wherein the polymer comprises in the range of about 68 mole percent to about 99 mole percent ethylene based on the moles of monomer.

5. The device of claim 1 wherein the polymer is selected from the group consisting of ethylene/$C_3$ to $C_{20}$ alpha-olefin copolymers and ethylene/$C_3$ to $C_{20}$ alpha-olefin/$C_3$ to $C_{20}$ diene terpolymers.

6. The device of claim 5 wherein the polymer selected from the group consisting of copolymers of ethylene/butene-1, ethylene/hexene-1, ethylene/octene-1, and ethylene/propylene and terpolymers of ethylene/propylene/1,4-hexadiene and ethylene/butene-1/1,4-hexadiene.

7. The device of claim 1 wherein the polymer has at least one property selected from the group consisting of a density in the range of about 0.87 g/cm³ to about 0.91 g/cm³, a melt index in the range of about 3 dg/min to about 30 dg/min, a molecular weight distribution in the range of about 1.8 to about 3.5, and a composition distribution breadth index greater than about 60 percent.

8. The device of claim 7 wherein the polymer comprises in the range of about 73 mole percent to about 98 mole percent ethylene based on the moles of monomer.

9. The device of claim 7 wherein the polymer is crosslinked with at least one of the group consisting of crosslinking agents and radiation.

10. The device of claim 7 wherein the polymer is crosslinked with at least dicumyl peroxide.

11. The device of claim 7 wherein the polymer is polymerized utilizing a metallocene catalyst system.

12. The device of claim 7 wherein the insulating member comprises up to 50 weight percent filler.

13. The device of claim 8 wherein the polymer has a tree rating less than about 25, a power factor in the range of about 0.0002 to about 0.0005, and a dielectric constant in the range of about 1.8 to about 2.4.

14. The device of claim 13 wherein the conductive member comprises at least one selected from the group consisting of aluminum, copper and steel.

15. An electrically conductive device having reduced treeing without the need of a treeing inhibitor, said device comprising:
   (a) an electrically conductive member comprising at least one electrically conductive substrate; and
   (b) at least one semiconductive member substantially surrounding the electrically conductive member, wherein the semiconducting member comprises a polymer selected from the group consisting of ethylene polmerized with at least one comonomer selected from the group consisting of $C_3$ to $C_{20}$ alpha-olefins and $C_3$ to $C_{20}$ polyenes, and wherein the polymer has a density in the range of about 0.86 g/cm³ to about 0.96 g/cm³, a melt index in the range of about 0.2 dg/min to about 100 dg/min, a molecular weight distribution in the range of about 1.5 to about 30, and a composition distribution breadth index greater than about 45 percent, and the semiconducting member further comprises a conducting filler to render it semiconducting.

16. The device of claim 15 wherein the polymer is crosslinked with at least dicumyl peroxide.

17. The device of claim 15 wherein the polymer is selected from the group consisting of ethylene/$C_3$ to $C_{20}$ alpha-olefin copolymers and ethylene/$C_3$ to $C_{20}$ alpha-olefin/$C_3$ to $C_{20}$ diene terpolymers.

18. The device of claim 17 wherein the polymer is selected from the group consisting of copolymers of ethylene/butene-1, ethylene/hexene-1, ethylene/octene-1, and ethylene/propylene and terpolymers of ethylene/propylene/1,4-hexadiene and ethylene/butene-1/1,4-hexadiene.

19. The device of claim 15 wherein the polymer comprises in the range of about 75 mole percent to about 94 mole percent ethylene based on the moles of monomer.

20. The device of claim 17 wherein the polymer has at least one property selected from the group consisting of a density in the range of about 0.865 g/cm$^3$ to about 0.93 g/cm$^3$, a melt index in the range of about 1 dg/min to about 50 dg/min, a molecular weight distribution in the range of about 1.7 to about 10, and a composition distribution breadth index greater than about 50 percent.

21. The device of claim 20 wherein the polymer is crosslinked with at least one of the group consisting of crosslinking agents and radiation.

22. The device of claim 15 wherein the polymer has a density in the range of about 0.87 g/cm$^3$ to about 0.91 g/cm$^3$, a melt index in the range of about 3 dg/min to about 30 dg/min, a molecular weight distribution in the range of about 1.8 to about 3.5, and a composition distribution breadth index greater than about 60 percent.

23. The device of claim 22 wherein the polymer is polymerized utilizing a metallocene catalyst system.

24. The device of claim 22 wherein the semiconducting member comprises up to 50 weight percent carbon black filler.

25. The device of claim 24 wherein the polymer has a tree rating less than about 15, a power factor in the range of about 0.0002 to about 0.0005, and a dielectric constant in the range of about 1.8 to about 2.4.

26. The device of claim 25 wherein the conductive member comprises at least one selected from the group consisting of aluminum, copper and steel.

27. A semiconductive device having reduced treeing without the need of a treeing inhibitor, said device comprising:
(a) a semiconductive member; and
(b) an electrically insulating member substantially surrounding the semiconductive member;
wherein at least one of the group consisting of the semiconductive member and the electrically insulating member comprises a polymer selected from the group consisting of ethylene polymerized with at least one comonomer selected from the group consisting of $C_3$ to $C_{20}$ alpha-olefins and $C_3$ to $C_{20}$ polyenes, and wherein the polymer has a density in the range of about 0.86 g/cm$^3$ to about 0.96 g/cm$^3$, a melt index in the range of about 0.2 dg/min to about 100 dg/min, a molecular weight distribution in the range of about 1.5 to about 30, and a composition distribution breadth index greater than about 45 percent, and wherein the semiconducting member comprises a filler to render it semiconducting.

28. The device of claim 27 wherein the polymer is selected from the group consisting of ethylene/$C_3$ to $C_{20}$ alpha-olefin copolymers and ethylene/$C_3$ to $C_{20}$ alpha-olefin/$C_3$ to $C_{20}$ diene terpolymers.

29. The device of claim 28 wherein the polymer is crosslinked with at least one of the group consisting of crosslinking agents and radiation.

30. The device of claim 28 wherein the polymer is crosslinked with at least dicumyl peroxide.

31. The device of claim 28 wherein the polymer has at least one property selected from the group of properties consisting of a density in the range of about 0.865 g/cm$^3$ to about 0.93 g/cm$^3$, a melt index in the range of about 1 dg/min to about 50 dg/min, a molecular weight distribution in the range of about 1.7 to about 10, and a composition distribution breadth index greater than about 50 percent.

32. The device of claim 28 wherein the polymer is selected from the group consisting of copolymers of ethylene/butene-1, ethylene/hexene-1, ethylene/octene-1, and ethylene/propylene and terpolymers of ethylene/propylene/1,4-hexadiene and ethylene/butene-1/1,4-hexadiene.

33. The device of claim 27 wherein the polymer has at least one property selected from the group consisting of density in the range of about 0.87 g/cm$^3$ to about 0.91 g/cm$^3$, a melt index in the range of about 3 dg/min to about 30 dg/min, a molecular weight distribution in the range of about 1.8 to about 3.5, and a composition distribution breadth index greater than about 60 percent.

34. The device of claim 33 wherein the polymer is polymerized with a metallocene catalyst system.

35. The device of claim 33 wherein the polymer comprises in the range of about 73 to about 98 mole percent ethylene based on the total moles of monomer.

36. The device of claim 33 wherein the semiconducting member comprises up to 50 weight percent carbon black filler.

37. The device of claim 36 wherein the polymer has a tree rating less than about 10, a power factor in the range of about 0.0002 to about 0.0005, and a dielectric constant in the range of about 1.8 to about 2.4.

38. The device of claim 37 wherein the conductive member comprises at least one selected from the group consisting of aluminum, copper and steel.

39. An electrically conductive device having reduced treeing without the need of a treeing inhibitor, said device comprising:
(a) an electrically conductive member comprising at least one electrically conductive substrate; and
(b) at least one protective layer substantially surrounding and supported by the electrically conductive member, wherein at least one layer comprises a polymer selected from the group consisting of ethylene polymerized with at least one comonomer selected from the group consisting of $C_3$ to $C_{20}$ alpha-olefins and $C_3$ to $C_{20}$ polyenes, and the polymer has a density in the range of about 0.86 g/cm$^3$ to about 0.96 g/cm$^3$, a melt index in the range of about 0.2 dg/min to about 100 dg/min, a molecular weight distribution in the range of about 1.5 to about 30, and a composition distribution breadth index greater than about 45 percent.

40. The device of claim 39 wherein the polymer is polymerized with a metallocene catalyst system.

41. The device of claim 39 wherein the polymer comprises in the range of about 73 to about 98 mole percent ethylene based on the total moles of monomer.

42. The device of claim 39 wherein the polymer has at least one property selected from the group consisting of density in the range of about 0.865 g/cm$^3$ to about 0.93 g/cm$^3$, a melt index in the range of about 1 dg/min to about 50 dg/min, a molecular weight distribution in the range of about 1.7 to about 10, and a composition distribution breadth index greater than about 50 percent.

43. The device of claim 39 wherein the polymer is selected from the group consisting of ethylene/$C_3$ to $C_{20}$ alpha-olefin copolymers and ethylene/$C_3$ to $C_{20}$ alpha-olefin/$C_3$ to $C_{20}$ diene terpolymers.

44. The device of claim 43 wherein the polymer is selected from the group consisting of copolymers of ethylene/butene-1, ethylene/hexene-1, ethylene/octene-1, and ethylene/propylene and terpolymers of ethylene/propylene/1,4-hexadiene and ethylene/butene-1/1,4-hexadiene.

45. The device of claim 39 wherein the polymer has at least one property selected from the group consisting of a density in the range of about 0.87 g/cm$^3$ to about 0.91 g/cm$^3$, a melt index in the range of about 3 dg/min to about 30 dg/min, a molecular weight distribution in the range of about 1.8 to about 3.5, and a composition distribution breadth index greater than about 60 percent.

46. The device of claim 45 wherein the protective layer comprises up to 50 weight percent carbon black filler.

47. The device of claim 45 wherein the polymer has a tree rating less than about 40, a power factor in the range of about 0.0002 to about 0.0005, and a dielectric constant in the range of about 1.8 to about 2.4.

48. The device of claim 47 wherein the polymer is crosslinked with at least one of the group consisting of crosslinking agents and radiation.

49. The device of claim 47 wherein the polymer is crosslinked with at least dicumyl peroxide.

50. The device of claim 47 wherein the conductive member comprises at least one selected from the group consisting of aluminum, copper and steel.

51. The device of claim 47 wherein the at least one protective layer comprises a first shield layer adjacent the conductive member, an insulation layer adjacent the first shield layer, a second shield layer adjacent the insulation layer, and a jacket layer adjacent the second shield layer.

52. The device of claim 47 wherein the at least one protective layer comprises an insulation layer adjacent the conductive member and a jacket layer adjacent the insulation layer.

* * * * *